May 27, 1952  A. H. PERLMAN  2,598,594
TIRE CHAIN ANCHOR DEVICE
Filed Aug. 21, 1947  2 SHEETS—SHEET 1
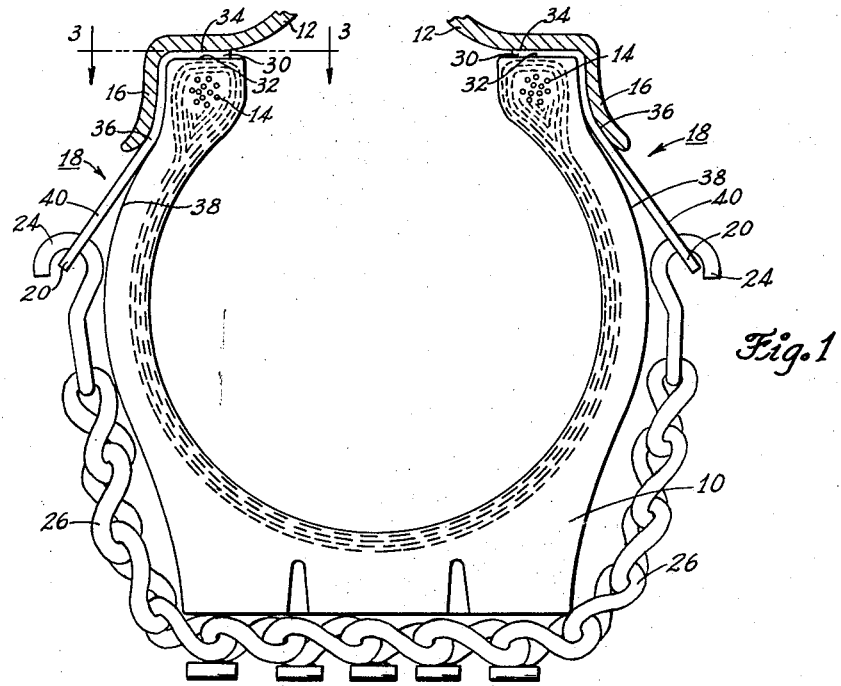
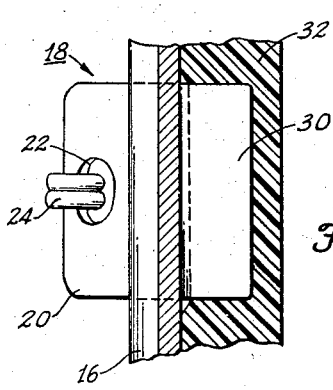
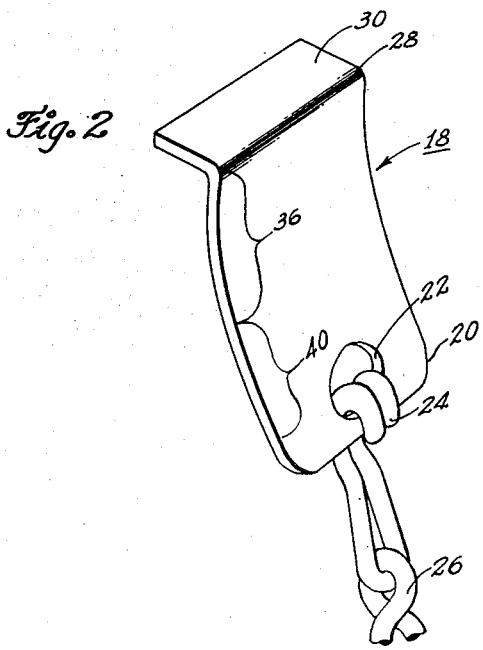
INVENTOR.
Alfred H. Perlman
BY
Richard C. Lindberg
ATTY.

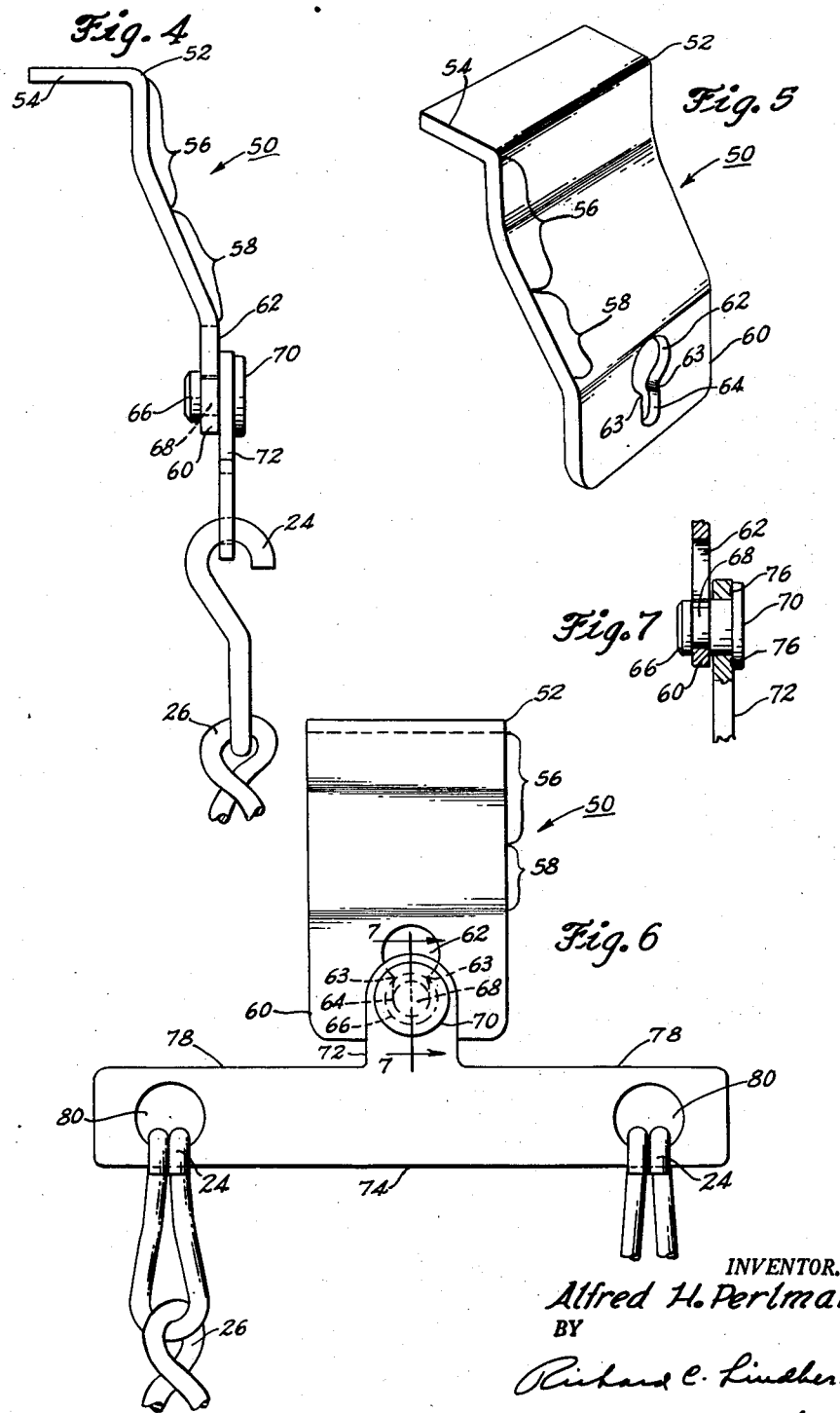

Patented May 27, 1952

2,598,594

UNITED STATES PATENT OFFICE 2,598,594

TIRE CHAIN ANCHOR DEVICE

Alfred H. Perlman, Chicago, Ill., assignor to Fral Manufacturing Co., Chicago, Ill., a corporation of Illinois Application August 21, 1947, Serial No. 769,928

3 Claims. (Cl. 152—233)

1

This invention relates generally to devices for anchoring cross-links of skid chains, and specifically to devices adapted to be anchored between a rim and tire for holding skid chain cross-links spanning the tread of a tire.

The devices to be found in the art for preventing skidding of automobiles on wet or icy roadways commonly employ chains which lie along each side of a tire, connected at their ends and connected to each other by cross-links which span the tire tread. Also employed are cross-links which are secured to a tire and wheel at a plurality of points by means of a web or belt which passes through the wheel at apertures provided therefor. Since many of the latest model automobiles do not provide these apertures in the wheels these cross-link devices cannot be employed on these models.

It is a principal object of the invention, and the present invention accordingly makes use of a plurality of paired members which are contiguous to the side walls of a pneumatic tire, each of the pair lying opposite each other on each side of the tire, the members being anchored between the side of the tire bead and the rim and also between the inner periphery of the bead and the rim.

Another object of the invention is to provide anchoring devices of the kind described having openings to receive the ends of a single cross-link, which may readily be removed in periods of clement weather leaving the anchoring devices in place along the tire and held between the bead and the rim until the cross-links are again required during periods of inclement weather.

Yet another object is to provide anchoring devices having an elongated opening for receiving a headed shank or pin hingedly connected to a T-shaped member, the ends of the arms of the T-shaped member having connected thereto a cross-link, thus providing an extremely rugged assembly for heavy duty use.

Other objects and advantages of the present invention will be apparent from a study of the description hereinafter, taken together with the drawings in which:

Figure 1 is a cross section through a pneumatic tire showing the anchoring device and cross-link assembly according to the present invention in elevation;

Figure 2 is an isometric view showing the anchoring device and cross-link;

Figure 3 is a view taken along the lines 3—3 of Figure 1;

Figure 4 is a side view of an anchoring device and cross-link according to another embodiment of the invention;

Figure 5 is an isometric view of the anchoring device shown in Figure 4;

Figure 6 is a front view of the anchoring device and cross-link assembly of Figure 4; and Figure 7 is a section taken on the lines 7—7 of Figure 6.

Referring now particularly to Figures 1 to 3 of the drawings, the present invention is shown as applied to a tire 10 which is mounted on a rim

2

12 of the drop-center type which is the type most commonly employed at the present time. The tire 10, as is well known, is inflated by an inner tube, not shown, which exerts a large lateral and radial pressure to maintain beads 14 firmly against flanges 16 of the rim 12.

According to the present invention anchoring devices, indicated generally by the ordinal 18, are held between the rim 12 and the tire 10 on opposite sides thereof, and include in the free ends 20 thereof apertures 22 to receive hooks 24 of cross-links 26 which span the tread of the tire 10.

Referring now particularly to Figure 2, the anchoring device 18 comprises a strip of metal which is bent as at 28 to provide a portion 30 to lie substantially along the inner periphery 32 of the bead 14, and between the inner periphery 32 and a portion 34 of the rim 12. Continuous with the portion 30 is a portion 36 which follows the contours of the flange 16 of the rim 12 and the contours of the side of the bead 14 and a portion of the side wall 38 of the tire 10. The portion 36 is also continuous with a third portion 40 which diverges from the side wall 38 of the tire 10 to provide clearance for the cross-links 26 held by the hooks 24 to the anchoring device as has already been described.

In order to position the anchoring devices which support the cross-links 26, tire 10 is partially deflated, preferably while the vehicle is jacked up, and the portions 30 and 36 of the strips 18 inserted between the bead 14 and the rim 12 with the portion 30 hooked around the inner periphery 32 of the bead 14 and against the portion 34 of the rim 12. The strips 18 are positioned on opposite sides of the tire 10 and spaced around the tire and rim at uniform intervals. With the strips 18 thus positioned around the tire and rim, the tire 10 is then inflated to proper pressure, and during periods of inclement weather the cross-links 26 may readily be attached to the strips 18. Preferably, the strips 18 are punched from cold rolled steel or any steel having resistance to corrosion, tension and bending stresses.

In the event the tire 10 should become under inflated the members 18 will not become displaced from their position between the rim 12 and the tire 10 since the portions 30 which lie against the inner periphery 32 of the bead will provide a hooking action assisted greatly by the radial components of force induced by whatever pressure prevailing in the tire 10. Without the provision of the portions 30 which give the hooking action just described the anchoring devices would work out when the tire became under inflated.

Referring now to Figures 4 to 7 inclusive, there is shown another embodiment of the invention particularly adaptable to heavy duty work as with trucks and buses and the like. The anchoring device according to this embodiment of the invention is indicated generally by the ordinal 50 and comprises a strip of metal bent as at 52 to provide a portion 54 adapted to lie along the inner periphery 32 of the bead 14 as in Figure 1. Similarly as in Figure 1, the portion 54 is continuous with a second portion 56 which follows the contours of the flange 16 of the rim 12 and the contours of the side of the bead 14 and a portion of the side wall 38 of the tire 10 as in Figure 1. This portion 56 is continuous with a third portion 58 which diverges from the side wall 38.

A free end 60 of the device 50 is provided with a circular aperture 62 which is contiguous with a slot 64, the aperture 62 being adapted to pass a head 66, and the slot 64 being adapted to engage a shank 68 of a pin 70 secured to a center leg 72 of a T-member 74 as by welding at 76. The connector or T-member 74 has a pair of arms 78, the ends of which are provided with circular openings 80 to receive the hooks 24 of the cross-links 26 which span the tread of the tire 10 as in Figure 1.

In order to hold the T-member 74 to the metal strip 50, but yet providing free swiveling in the slot 64, the entrance to the slot is constricted somewhat by small nubs 63 located at the point where the slot 64 intersects the aperture 62. It will be apparent that the nubs 63 give a snap action to indicate that the T-member 74 supporting the cross-links is properly positioned.

As with the arrangement shown in Figures 1 to 3, the devices 50 are positioned one each side of the tire 10 and between the tire 10 and the rim 12, and spaced preferably at equal intervals around the tire. In order to position the devices the tire 10 is first partly deflated and the portions 54 inserted between the inner periphery 32 and portion 34 of the rim 12. When the devices 50 are properly located and the tire 10 is inflated to proper pressure the devices 50 will remain secured in position under all driving conditions. At times of inclement weather the T-member 74, together with the cross-links 26, is quickly and easily snapped into place at the ends 60 of the strips 50. Should the tire 10 become under inflated for any reason the portions 54 will give a hooking action assisted by the radial components of force induced by whatever pressure prevailing in the tire 10.

While the invention has been described in terms of more than one preferred embodiment thereof, its scope is not to be limited by the embodiments shown, but only by the claims here appended.

I claim:

1. The combination of a cross-link anchor and cross-link assembly for a tire chain for a pneumatic tire held by inflation thereof to a straight side rim in which each of said cross-link anchors comprises a strip of metal lying one on each side of and conforming to the countours of said rim and lying between said rim and said tire along the bead portion of said tire only, each of said strips having a portion which is bent to lie substantially along the inner periphery of the bead of said tire and between the inner periphery of said bead and said rim, a second portion which is bent at substantially right angles to said first named portion and continuous with said first named portion, said second portion following the inside contours of said rim and the side of the bead of said tire, a third portion which is continuous with said second portion and so formed so as to diverge from the side wall of said tire and extend in a direction towards the tread of said tire to provide for flexing of the side walls of said tire, means comprising a chain-link hanger affording a connection between said cross-link and said divergent third portion, and means for releasably locking said last named means to said divergent third portion including an opening formed in said divergent third portion and having a circular admission portion and a locking slot contiguous therewith for a locking pin formed on said connecting means, said locking pin having a head of such a dimension as to pass through said circular admission portion and a shank of such a dimension as to move to locking position in said slot.

2. The invention as defined in claim 1 characterized by a constriction in said locking slot whereby said shank may move into said slot with a snap action to indicate the proper positioning of said locking pin.

3. The combination of a cross-link anchor and cross-link assembly for a tire chain for a pneumatic tire held by inflation thereof to a straight side rim in which each of said cross-link anchors comprises a strip of metal lying one on each side of and conforming to the contours of said rim and lying between said rim and said tire along the bead portion of said tire only, each of said strips having a portion which is bent to lie substantially along the inner periphery of the bead of said tire and between the inner periphery of said bead and said rim, a second portion which is bent at substantially right angles to said first named portion and continuous with said first named portion, said second portion following the inside contours of said rim and the side of the bead of said tire, a third portion which is continuous with said second portion and so formed so as to diverge from the side wall of said tire and extend in a direction towards the tread of said tire to provide for flexing of the side walls of said tire, means affording a connection between a pair of cross-links and said divergent third portion including a T-shaped member having arms providing a point of connection at each end thereof for one of said cross-links, and means for locking said T-shaped member to said divergent third portion including an opening formed in said divergent third portion and having a circular admission portion and a locking slot contiguous therewith for a locking pin extending from said T-shaped member, said locking pin having a head of such a dimension as to pass through said circular admission portion and a shank of such a dimension as to move to locking position in said slot.

ALFRED H. PERLMAN.

REFERENCES CITED

The following references are of record in the file of this patent:

UNITED STATES PATENTS

| Number | Name | Date |
|---|---|---|
| 1,185,084 | Gahan | May 30, 1916 |
| 1,194,433 | Silberman | Aug. 15, 1916 |
| 1,224,248 | Wayrynen | May 1, 1917 |
| 1,258,204 | Egy | Mar. 5, 1918 |
| 1,492,040 | Lifquist | Apr. 29, 1924 |
| 1,891,637 | Frank | Dec. 20, 1932 |

FOREIGN PATENTS

| Number | Country | Date |
|---|---|---|
| 13,687 | Great Britain | Mar. 13, 1913 |
| 56,702 | Norway | June 15, 1936 |